US 11,386,480 B1

(12) United States Patent
Singh

(10) Patent No.: US 11,386,480 B1
(45) Date of Patent: Jul. 12, 2022

(54) PRODUCT INFORMATION DISTRIBUTION AND CONFIRMATION OF RECEIPT OF SAME

(71) Applicant: Wells Fargo Bank, N.A., San Francisco, CA (US)

(72) Inventor: Manpreet Singh, Guwahati (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 863 days.

(21) Appl. No.: 15/679,894

(22) Filed: Aug. 17, 2017

(51) Int. Cl.
*G06Q 30/06* (2012.01)
*G06Q 30/00* (2012.01)
*G06Q 10/08* (2012.01)
*G06Q 10/10* (2012.01)
*G06Q 20/40* (2012.01)

(52) U.S. Cl.
CPC ....... *G06Q 30/0633* (2013.01); *G06Q 10/087* (2013.01); *G06Q 10/10* (2013.01); *G06Q 20/401* (2013.01); *G06Q 30/018* (2013.01)

(58) Field of Classification Search
CPC .. G06Q 30/0633; G06Q 10/087; G06Q 10/10; G06Q 20/401; G06Q 30/018
See application file for complete search history.

(56) References Cited

U.S. PATENT DOCUMENTS

| | | | |
|---|---|---|---|
| 5,771,291 A * | 6/1998 | Newton | G06F 21/46 380/277 |
| 9,235,375 B2 | 1/2016 | Byers | |
| 9,258,286 B1 * | 2/2016 | Voutour | H04L 63/08 |
| 10,268,995 B1 * | 4/2019 | Zimmerman | G06Q 20/10 |
| 10,275,760 B2 * | 4/2019 | Marcus | G06Q 20/32 |
| 10,387,857 B2 * | 8/2019 | Kim | G06Q 20/02 |
| 2002/0023047 A1 * | 2/2002 | Noju | G06Q 30/0601 705/37 |
| 2002/0038289 A1 | 3/2002 | Lawlor et al. | |
| 2007/0180024 A1 * | 8/2007 | Piccionelli | H04L 63/10 709/203 |
| 2008/0076402 A1 * | 3/2008 | Jeong | H04N 21/4722 348/E7.071 |
| 2008/0103941 A1 | 5/2008 | Hussain | |
| 2008/0120224 A1 | 5/2008 | Newcomb et al. | |

(Continued)

FOREIGN PATENT DOCUMENTS

WO    2014007973    1/2014

OTHER PUBLICATIONS

EBay applies for patent on classifying communications with human-based interactive questions. (May 26, 2016). Global IP News. Business and Commerce Patent News Retrieved from https://dialog.proquest.com/professional/docview/1791377086?accountid=131444 on Mar. 12, 2022 (Year: 2016).*

*Primary Examiner* — Kito R Robinson
(74) *Attorney, Agent, or Firm* — Womble Bond Dickinson (US) LLP

(57) ABSTRACT

Systems and methodologies are disclosed that enable the distribution of production information and confirmation of the receipt of such information. The system and methodologies of the innovation require an access code to complete a transaction or application process. Use of the system and methodologies of the innovation enable customers to review accurate product information prior to purchasing a product and also provides greater protections against fraudulent purchases.

16 Claims, 7 Drawing Sheets

(56) References Cited

U.S. PATENT DOCUMENTS

| | | | |
|---|---|---|---|
| 2009/0089205 A1* | 4/2009 | Bayne | G06Q 40/02 705/38 |
| 2010/0125510 A1 | 5/2010 | Smith et al. | |
| 2010/0257456 A1* | 10/2010 | Lieb | H04L 67/02 715/741 |
| 2010/0268792 A1 | 10/2010 | Butler et al. | |
| 2014/0236767 A1 | 8/2014 | Duggal et al. | |
| 2014/0351133 A1* | 11/2014 | Christian | G06Q 20/40 705/44 |
| 2015/0102907 A1* | 4/2015 | Hadizad | G07C 9/20 340/5.64 |
| 2015/0278866 A1* | 10/2015 | Levi | G06Q 10/087 705/14.58 |
| 2016/0343072 A1 | 11/2016 | Mohnot | |

\* cited by examiner

PRODUCT INFORMATION DISTRIBUTION AND CONFIRMATION OF RECEIPT OF SAME

The innovation disclosed herein relates generally to the confirmed distribution of accurate product information prior to consumer application and/or acceptance of a new product. More particularly, the use of an access code distributed after confirmed receipt of product information in the financial and retail industries to enhance transaction authentication and prevent misunderstanding and/or misinformation regarding product features or details.

BACKGROUND

During product review and marketing, it is important to provide consumers with accurate information regarding product features and the terms and conditions for purchasing the product. This is especially true of financial products that may have varying levels of complexity. Sales information provided by a salesperson may be misstated by the salesperson or misunderstood by the consumer, resulting in the purchase of a product that does not match the consumer's expectations. This can result in dissatisfied customers and even allegations of fraud by the salesperson. Thus, it is important to ensure that accurate information regarding a product and the terms and conditions for purchasing the product are supplied and agreed to prior to purchase of the product.

Also of concern is the use of erroneous or fraudulent contact details (e.g., email addresses and phone numbers) for purchasing products. For example, a consumer may be signed up for a product without her knowledge resulting in hardship for both the consumer and the company supplying the product (e.g., fraudulent credit card accounts).

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, systems and methodologies are disclosed that enable the distribution of production information and confirmation of the receipt of such information. The system and methodologies of the innovation require an access code to complete a transaction or application process. Use of the system and methodologies of the innovation enable customers to review accurate product information prior to purchasing a product and also provides greater protections against fraudulent purchases.

In one embodiment, the system includes a product information and commitment architecture comprising a product request receiving component, a product information component, a code generation component, and a product obtainment component. It is understood that the system may be configured in such a way as to combine the functionality of the component in most any reasonable manner.

In one embodiment, the product request receiving component receives an information request. This request can come from most any type of electronic device capable of communicating with the system. Suitable examples include a scanner, a computer, or mobile device such as a smart phone or tablet.

Upon receipt of the product request, the product information component may obtain the product information via, for example, a lookup component. A rendering component can then display the product information. In one embodiment, the product information is displayed as a video. An acknowledgement component may determine whether the product information has been displayed. In one embodiment, the acknowledgement component may include a determination that the product video display has completed. In another embodiment, the video may include an interactive element (e.g., radio buttons) that requires input to continue. For example, at set points in the video, the system may pause the video until the viewer clicks on a radio button and/or correctly answers a question about the product. Once the acknowledgement component verifies that the product information has been displayed, the system may generate a unique access code. This unique access code is required by the product obtainment component to either purchase the product or to continue with an application process. In one embodiment, the pause(s) in the video may be randomly or may be at set points as determined by the system.

In one embodiment, the system is used to provide information regarding a financial service offered by a financial institution. A customer must qualify and complete an application to obtain the financial services. During the application process, the customer must view product information and obtain a unique access code to complete the application. Once the unique access code is verified by the system, the customer can submit the application.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
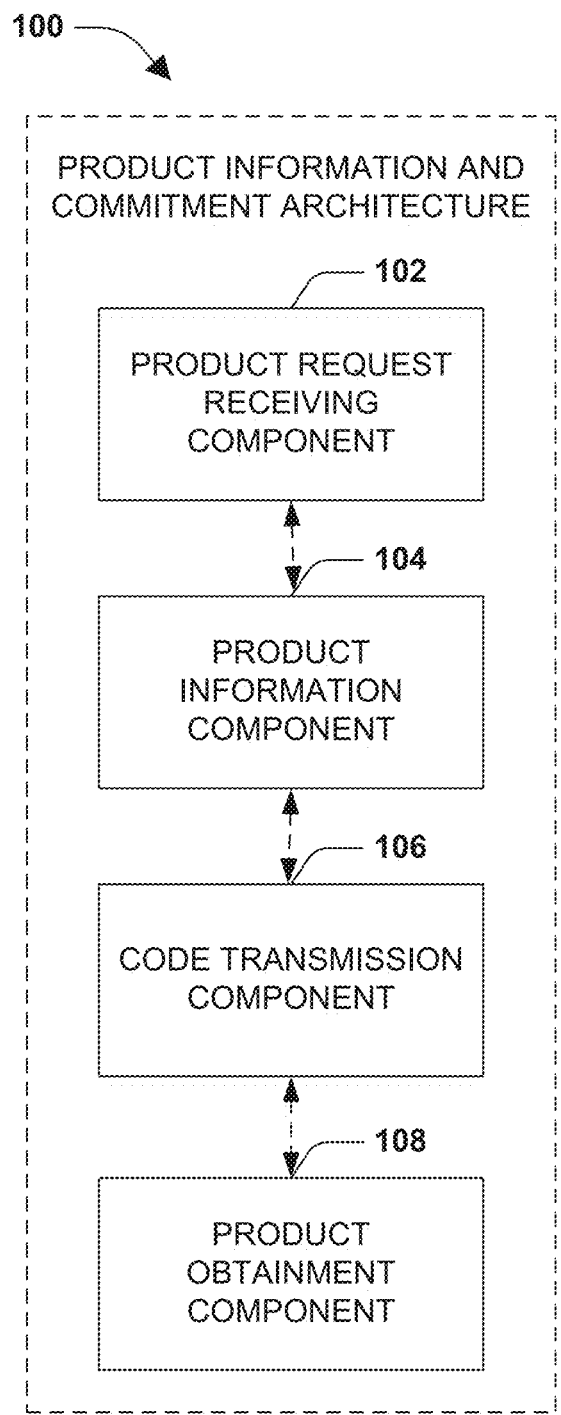
FIG. 1 illustrates an example embodiment of a product information system in accordance with the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., communication devices, network protocols, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, in aspects, both an application running on a server and the server can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

As used herein, the terms "product" or "service" generally refer to any type of product or service offered in commerce. The use of either "product" or "service" is intended to refer to both products and services.

According to an aspect of the innovation, a consumer must provide an access code generated by the system or method after confirmation that accurate product information has been supplied to the consumer to complete the application for or purchase of a product In one embodiment, the access code is supplied by electronic means (e.g., by electronic mail or text message). In one embodiment, the access code is a bar code, an alphanumeric code, or a confirmation link.

In one embodiment, the system provides accurate product information in an easy to understand form for a customer interested in a product or service. In one embodiment, the system requires a potential customer to fill out a form (e.g., an application) to authenticate the desire to purchase a product. In one embodiment, the form may be a manual form. In another embodiment, the form may be an electronic form, such as an online form linked to or associated with a company's website.

According to an aspect of the innovation, the system includes a rendering (e.g., a video or other digital component) that explains the product or service that must be viewed prior to purchasing the product or completing an application for a product. The system may include video, audio, image, or electronic documents, and/or any other digital content or other rendering to convey information to the customer.

In one embodiment, the system includes a product information component. The product information component may include a rendering component that displays the video or other digital content. In one embodiment, the video or other digital content may include a full explanation of product details, an explanation of the terms and conditions, an explanation of the requirements to qualify for a product or service, or any other aspect of the product or service that may improve customer understanding or customer satisfaction.

In one embodiment, when asked to fill out a manual form, the form may have a product information request code that can be used to access the video or digital component. In one embodiment, the product information request code may be a machine-readable representation of data such as linear and 2D bar codes such as UPC codes and QR codes. The product information request may be a URL or a product name/number or most any means for locating the video or digital content.

In one aspect of the innovation, the product information is a video that is displayed upon receipt of the product information request. The video may include any pertinent details relating to the product/service, including, but not limited to, pricing information, fees to be born by the customer, restrictions, etc. The product information may be in most any digital format such as a video, electronic documents (e.g., a slideshow presentation), or a combination thereof.

In one aspect of the innovation, the product information component may further include an acknowledgement component that determines the digital content has been presented to the customer. For example, the video may stop at random intervals and restart once required activity has taken place (e.g., by clicking on a radio button). In one embodiment, the acknowledgement component determines whether a customer has understood the information presented in the digital content. Most any method for determining whether a customer has understood the information contained in the digital content may be employed. For example, the digital content may include interactive questions that must be correctly answered for the digital content (e.g., a video) to proceed. It will be understood that most any method for determining whether a video or digital content has been viewed may be employed.

According to an aspect of the innovation, the system may further comprise a code generation component. Once acknowledgement of the video or digital content has been adequately confirmed, the code generation component generates a unique access code. The access code may be most any type of access code including an alphanumeric code or a bar code. It will be appreciated that the term "access code" refers to any means for allowing access to features and/or contents.

In one embodiment, the access code is generated after appropriate acknowledgement/verification of the product details, the terms and conditions associated with the purchase of the product, or both. For example, once a consumer has viewed a video describing the features of a given product, the consumer may be required to answer questions to demonstrate an adequate understanding of the product. Once correct answers are received, the system may communicate the access code to the customer that then allows the product to be purchased or the application/form to be submitted.

In one embodiment, the purchase of the product or completion of the application process is accomplished only upon entry of an access code. In one example, the access code is unique for a given customer and may be sent to the contact number or email address of a registered customer. Use of the unique access code along with other identifying information may authenticate the purchase/application.

In one embodiment, the purchase of the product and/or completion of the application process may be verified via two-factor authentication. In an example, a unique access code may be generated upon successful completion of a product information video. This unique access code is then sent to a registered customer's contact number (e.g., via a phone call or text) and/or email address. The access code is configured for a particular transaction/application for a particular customer and may be used to authenticate a sale. In one example, a second authentication process may be required. For example, customer biometrics may be used to verify customer identity. In one embodiment, biometrics includes fingerprint, face recognition, retinal scans, etc. and may be collected by most any known means including, but not limited to, a customer's smart devices (e.g., smart phone or tablet), machines available to the salesperson, or a visit to the nearest POS location to provide biometrics etc.

In one embodiment, the application for a product may include an online application accessible from a desktop computer, kiosk, or other electronic device, including a mobile device, at the POS location (e.g., the financial institution, a retail store, etc.). The online application may include a link, icon, or embedded file capable of opening or displaying the digital product information. In one embodiment, the application for a product may include a physical application that is completed either at the POS location or remotely. In this embodiment, the application or accompanying information (e.g., a brochure or instructions) may include a bar code, such as a QR barcode, a URL, a product identification code, or any other means for accessing digital product information. It will be appreciated that physical information (such as a product brochure) may be used to access product information even when completing on-line applications/forms. In one embodiment, the application for a product may include an online application accessible from a computer or mobile device such as a smart phone or tablet. The online application may include a link, icon, or embedded file capable of opening or displaying the digital product information.

According to an aspect of the innovation, confirmation of the receipt of the digital product information can be used to generate a unique access code. It is to be understood that the access code can be most any means for allowing access to functionality or content of the system including, but not limited to an encryption key, access code, password, or other digital access code, all of which are encompassed by the term "access code." In one embodiment, the unique access code permits the customer to purchase the product or to complete the application process. In one embodiment, the unique access code can be associated with a specific user, a specific product, a specific application/form, or any combination thereof. The unique access code may also be associated with identifying information such as customer name, address, date, web IP Address, geo-location, application number, etc.

The unique access code can be transmitted by most any modality including but, not limited to text (e.g., SMS, MMS) message, email, telephone, or the like. Once transmitted, the unique access code can be entered into the application or form where it can be validated by the validation component.

The validation component may verify the access code. Once verified, the validation component may authorize product obtainment or may allow for the submission of an application or form. In one embodiment, the validation component may require confirmation of customer identity. In one embodiment, the validation component may confirm customer identity by associating the unique access code with customer identifying information (e.g., a customer phone number, email address, or mailing address). In one embodiment, customer identity may be further confirmed using other information such as biometric information. While verification of the access code is being described herein as a final step in the product acquisition, it is to be understood that verification can take place at any point in the transaction.

The innovation discloses systems and methodologies that can promote customer education by requiring pertinent information to be accurately conveyed to the customer. This can be accomplished at the POS (e.g., a financial institution or retail store) or remotely (e.g., from a customer's home). Whether the customer fills out a paper or electronic form, the innovation displays product information in a way that can be verified. As described herein, in some aspects, the innovation ensures that a consumer has viewed and understood pertinent product information and/or terms and conditions before a product or service is purchased. Additionally, the innovation may provide additional protection against fraudulent purchases by associating customer identifying information.

By way of example and not limitation, an access code may be associated with a specific customer's account number. If the account number associated with the access code does not match the account number entered in the application form, the system may identify the discrepancy. This additional layer of security may assist in preventing errors and flag transactions that may be fraudulent.

With reference now to the figures, FIG. 1 illustrates an example embodiment of a product information system 100 in accordance with the innovation. As shown, system 100 can include a product request receiving component 102 that receives a request for product information. The request may be made by or on behalf of a customer. It is to be understood that the products and services described herein refer to most any product or service available to a customer. In one embodiment, the system may be used for financial products or services and the customer may be an account holder, including a credit-, bank-, charge- or debit-card holder. It is to be appreciated that an account can be most any account by which the customer is financially responsible, including but not limited to bank/financial institution accounts, credit accounts, third party service (e.g., mobile device) accounts or the like.

In the example of FIG. 1, the product request receiving component 102 can communicate with the product information component 104 to retrieve the requested product information. In examples, the product request receiving component 102 can monitor requests for a product through online applications or forms, product name, an alphanumeric code, a bar code, a QR code, or the like. Upon identifying a request, the system 100 can trigger or initiate product information look-up. As shown, it is to be appreciated that the innovation can be employed in most any transaction venue, including but not limited to, point of sale (POSs), such as at a financial services institution and/or kiosks, a car dealership, a retail store, etc., as well as e-pay and internet apps (not shown) or the like. For instance, while the specification describes face-to-face personal transactions and classic big box POS transactions, the spirit and scope of the innovation is intended to include online transactions as well as other identifiable transactions.

The following example is provided to add context to the innovation and specifically not to limit the scope in any manner. With continued reference to FIG. 1, in one example, a customer is interested in acquiring a new credit card at a financial institution. Upon a discussion with a salesperson, the customer decides that he would like to apply for credit card XY. In this example, the application may be a physical paper application that includes a QR code. Upon scanning the QR code the product request receiving component is triggered. Depending on the facts and circumstances of a product or the needs of a particular service provider, the product information component may retrieve a video, a webpage, or other digital information describing features of the product, services, the application process, or the terms and conditions for the product or services, or a combination thereof.

Continuing with the example, once the product request receiving component 102 receives the request and the product information is retrieved by the product information component 104, in one aspect of the innovation, the system may generate a code upon the triggering of an event by the product information component. According to an embodiment as set forth in FIG. 2, the product information component 200 may include an acknowledgement component 206. Once the video or other digital content has been viewed, acknowledgement may be triggered by most any known means including but, not limited to, the end of the video playing, the receipt of correct responses to questions regarding the video or digital content, the clicking on a radio button after the completion of a video or the reading of digital content, or the like. The code generating component 300 then generates a code to be used by the system to complete the product transaction or to submit the application for the desired product.

In accordance with aspects of the innovation, the code may be communicated by the code transmission component 106 using most any modality including but, not limited to text (e.g., SMS, MMS) message, email, telephone, or the like.

The system may use the code generated and communicated via the code transmission component to complete the product transaction or the application for the desired product via the product obtainment component 108. For example, the system can authorize and/or permit proceeding with the transaction/payment for a product or service, or may authorize and/or permit an application/form to be submitted for a product or service.

In one embodiment, prior to authorization, the system can confirm identifying information of the customer as a means of validating identity and maintaining current contact information. For example, the system may require an email address or telephone number for communicating the access code. Other aspects can require other or additional authorization (e.g., a PIN (personal identification number), an automated voice validation call, answers to security questions etc.).

Figure 2:
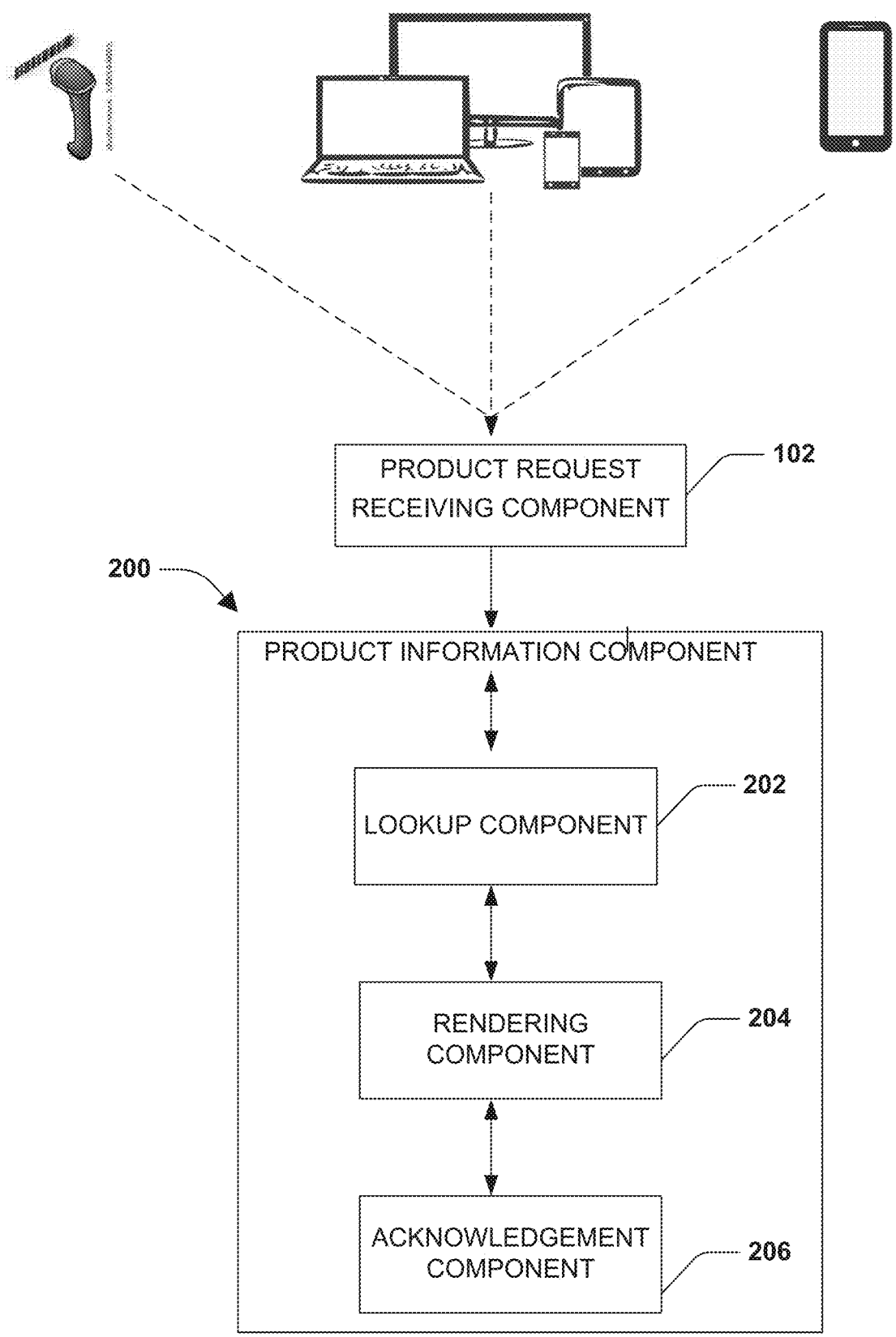
FIG. 2 illustrates an example embodiment of a product information component in accordance with the innovation.

FIG. 2 illustrates the product information component 200 according to an embodiment of the innovation. The product information component may receive a product information request from the product request receiving component 102. The product request receiving component 102 can employ most any mechanism known in art to identify the request. Assuming the POS location, the salesperson, or the customer has a scanner, a computer, or an active mobile device, the product information request can be generated. It is to be understood and appreciated that the product request receiving component can be capable of real- or near real-time monitoring (e.g., via a monitoring component) of transactions initiated using a customer's pre-existing account (e.g., through a mobile app, etc.) to provide up-to-date information regarding products already owned/subscribed to by the customer.

The product information component may include a lookup component 202 that retrieves the product information. The rendering component 204 may provide a display of the product information requested. The product information component 200 may also include an acknowledgement component 206 that verifies the delivery of the product information.

Figure 3:
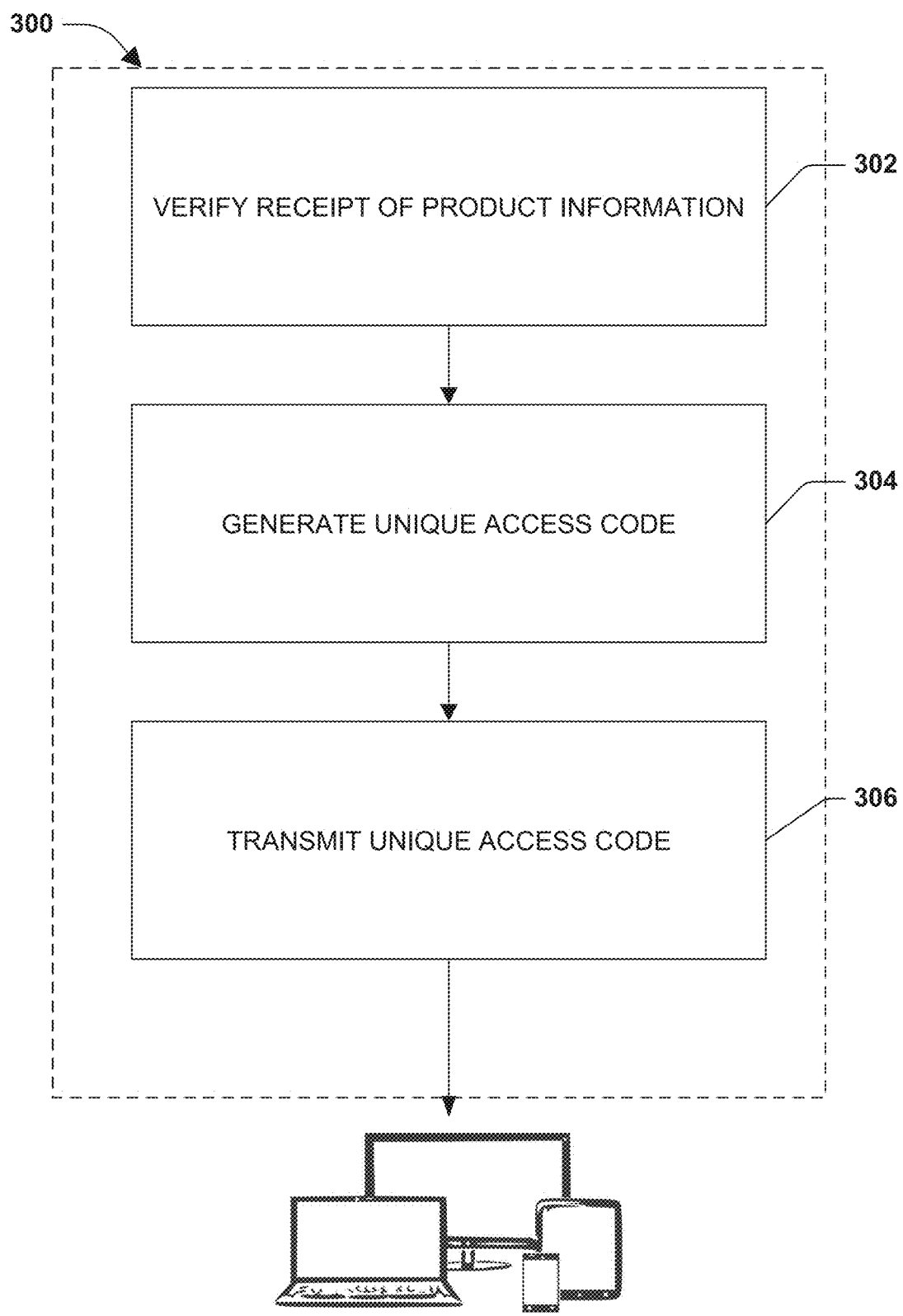
FIG. 3 illustrates an example embodiment of a code transmission component in accordance with aspects of the innovation.

FIG. 3 illustrates a more detailed view of an example of a code transmission component 300 according to the innovation. In one embodiment, the code transmission component verifies 302 the delivery of the product information and generates 304 a unique access code. The unique access code can then be transmitted 306. The code transmission component can transmit the unique access code via any modality, including phone, text, or email.

Figure 4:
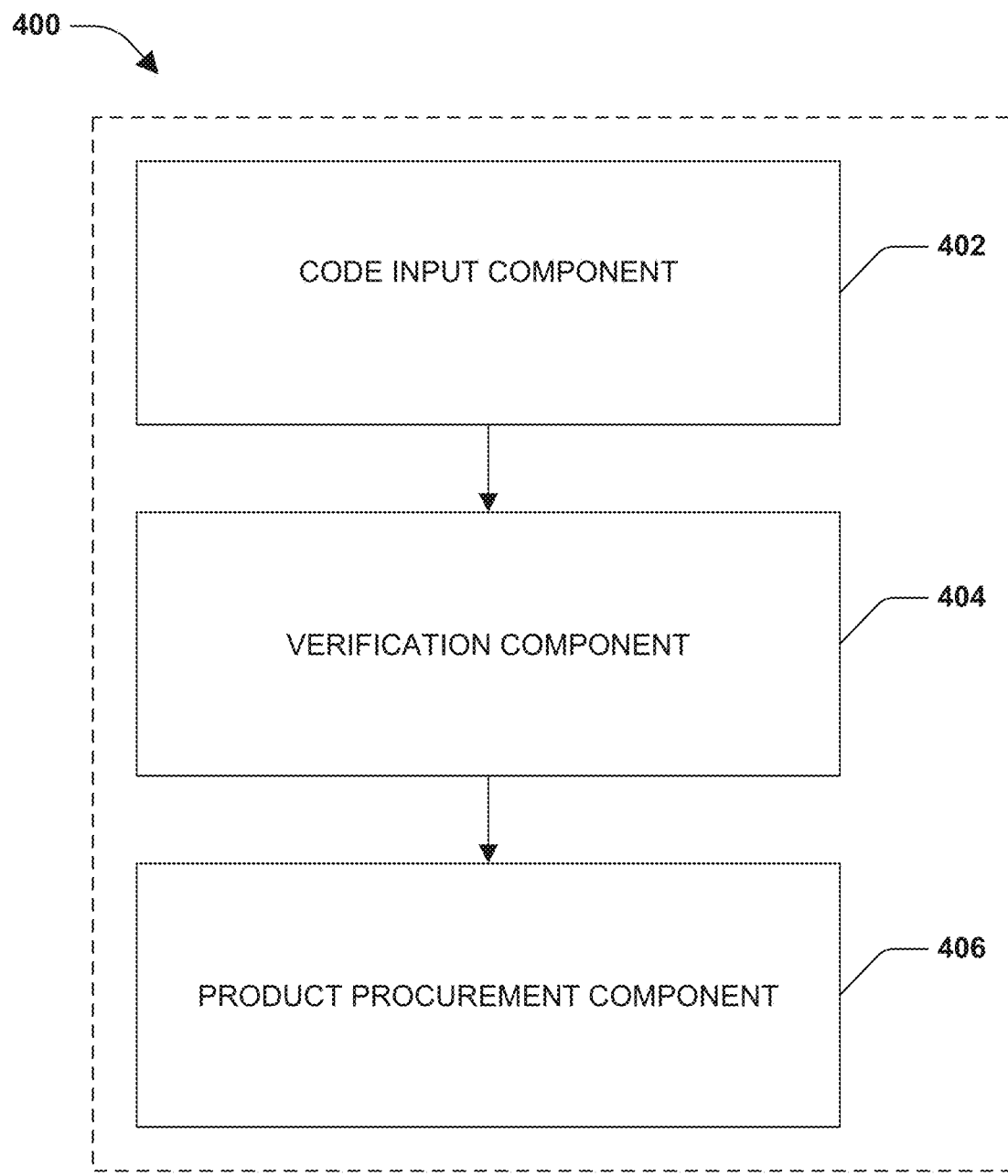
FIG. 4 illustrates an example embodiment of product obtainment component in accordance with the innovation.

FIG. 4 illustrates a more detailed view of an example of a product obtainment component 400 in accordance with an aspect of the innovation. Here, as described above, once a unique access code is generated and transmitted, the access code may be used by the system to communicate with the product obtainment component to complete the transaction. In one embodiment, the completed transaction results in the sale of a product or the obtainment of a service. In another embodiment, the completed transaction results in the submission of an application or form.

In one embodiment, the product obtainment component 400 may include a code input component 402 and a verification component 404. The code input component 402 receives and recognizes the unique access code, while the verification component 404 verifies that the unique access code is properly associated with either the product or service being purchased/applied for, the customer, or both. The product obtainment component 400 may also include a product procurement component 406 that completes the transaction. In one embodiment, the product procurement component 406 may complete the sale or obtainment of a product or service. In another embodiment, the product procurement component 406 may permit a user to complete and/or submit an online application or form. It is to be understood that the product obtainment component may be used to complete most any kind of transaction.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 5:
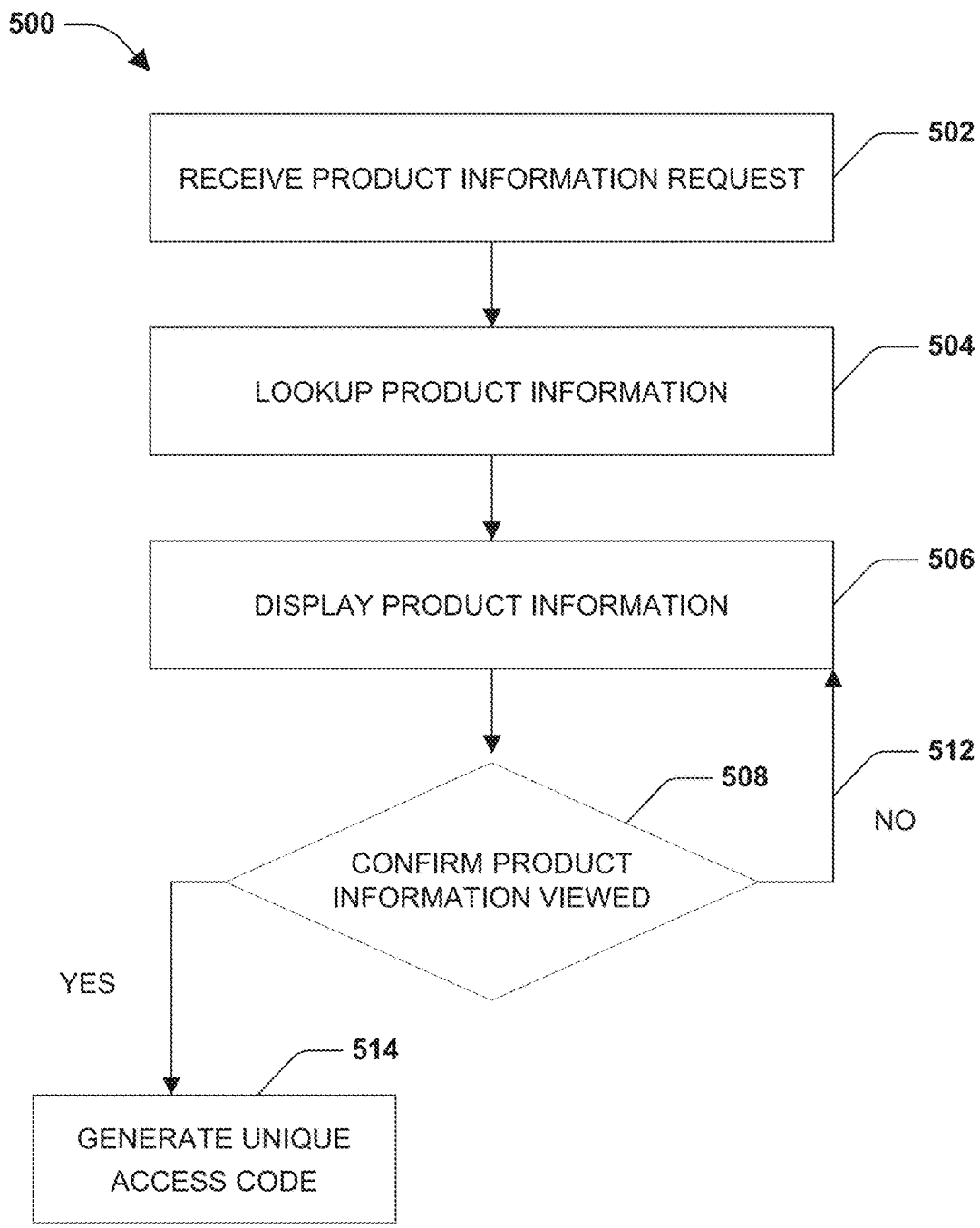
FIG. 5 illustrates an example methodology of product information distribution and confirmation in accordance with the innovation.

FIG. 5 illustrates an example methodology 500 of obtaining a unique access according to an embodiment of the innovation. In one embodiment, a product information request is received 502, triggering product lookup 504 and the display of product information 506. In one embodiment, the product information may be a video or electronic document. Confirmation that the product information has been displayed is required 508 for the generation of a unique access code 514. In one embodiment, confirmation requires validation of correct responses to questions regarding the content of the product information.

The following discussion is included to provide more context to the innovation and is specifically not intended to limit the innovation in any manner. It is to be understood and appreciated that other variations of the features, functions and benefits of the innovation exist which are intended to be included within the spirit and/or scope of the innovation and claims appended hereto.

In aspects and in operation, a product request can be accomplished via a direct request for product information or may be made during the application process for a new product/service and may be initiated via physical means (e.g., a barcode on a paper brochure) or digital (e.g., a link embedded in an online application form). Here, the product information request is triggered by a barcode on a paper application that is being completed by a prospective customer in a financial institution.

The customer may be working with a salesperson or may obtain a physical application from a display, or by any other reasonable means. As part of the application process, the system may require an access code to confirm that the customer has viewed pertinent product information. The system may also confirm that certain aspects of the product information has been understood by the customer. It can also require an access code to confirm that product terms and conditions have bee viewed. With regard to a process for retrieving product information, as described, the system may initiate product information retrieval upon receipt of product information request in the form of a product name, an alphanumeric code, a bar code, or any other known means for requesting information. The request can be accomplished via a scanner or other handheld digital device for receiving bar code information.

In another scenario the prospective customer may be an online customer of a financial institution interested in applying for a new credit card. The online application form may have a link or radio button to initiate a product information request. In one example, the online form or application cannot be submitted until an access code is entered and validated. The access code can be obtained by viewing a video or digital content regarding the product being offered. In one example, the access code can be obtained after correctly answering questions regarding the product. In another example, the access code can be obtained after correctly entering information contained within the video or digital content. For example, a video may pause until a radio button is clicked to continue playing. In another example, the access code may be obtained after the allotted time for the video to play or after the digital content has been viewed.

Figure 6:
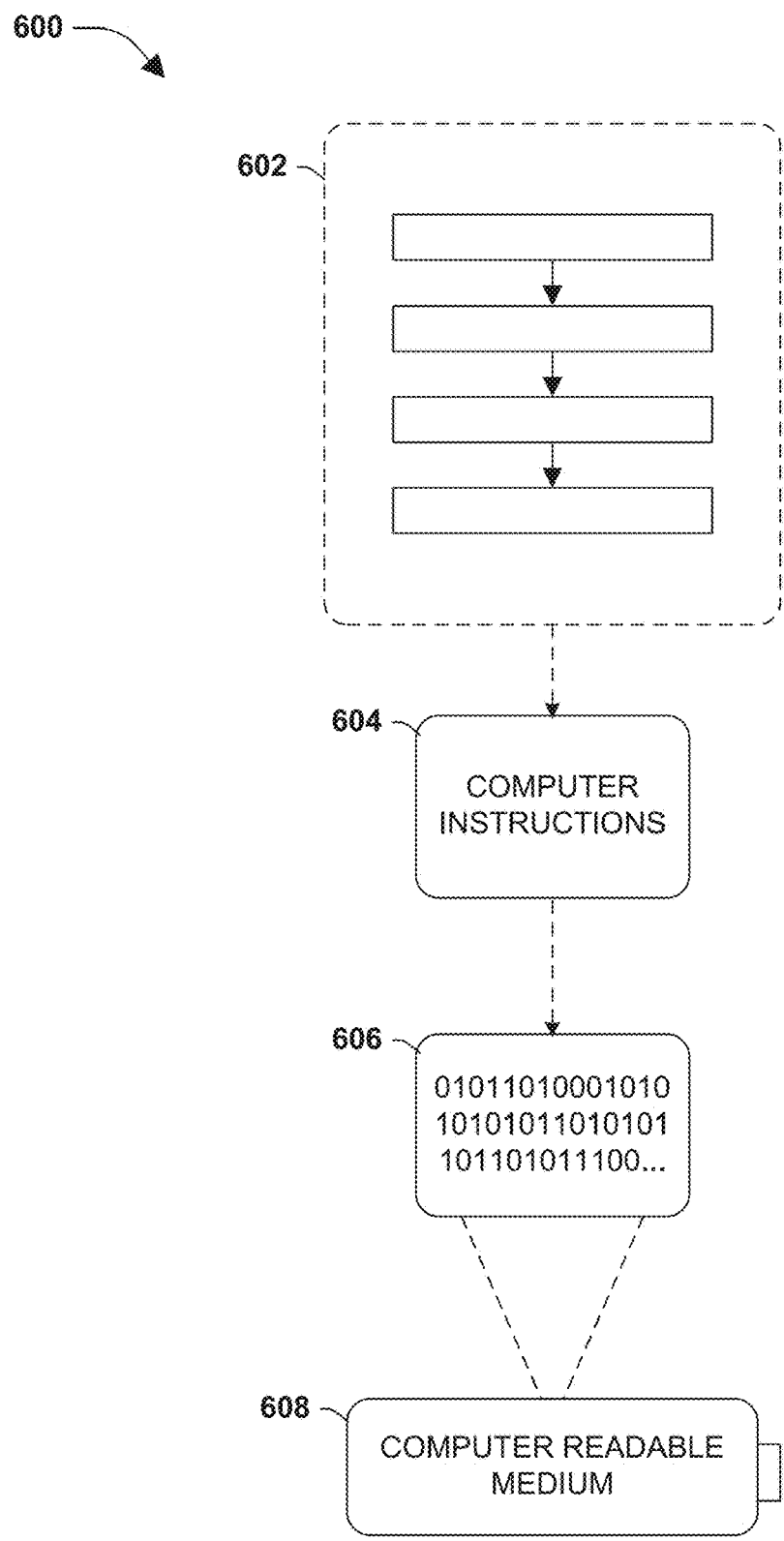
FIG. 6 illustrates an example computing environment that enables aspects of the innovation.

Still another embodiment involves a computer-readable medium including processor-executable instructions configured to implement one or more embodiments of the techniques presented herein. An embodiment of a computer-readable medium or a computer-readable device devised in these ways is illustrated in FIG. 6, wherein an implementation 600 includes a computer-readable medium 602, such as a computer-readable medium 608, such as a CD-R, DVD-R, flash drive, a platter of a hard disk drive, etc., on which is encoded computer-readable data 606. This computer-readable data 606, such as binary data including a plurality of zero's and one's as shown in 606, in turn includes a set of computer instructions 604 configured to operate according to one or more of the principles set forth herein. In one such embodiment 600, the processor-executable computer instructions 604 may be configured to perform a method 602, such as method 500 of FIG. 5. In another embodiment, the processor-executable instructions 604 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
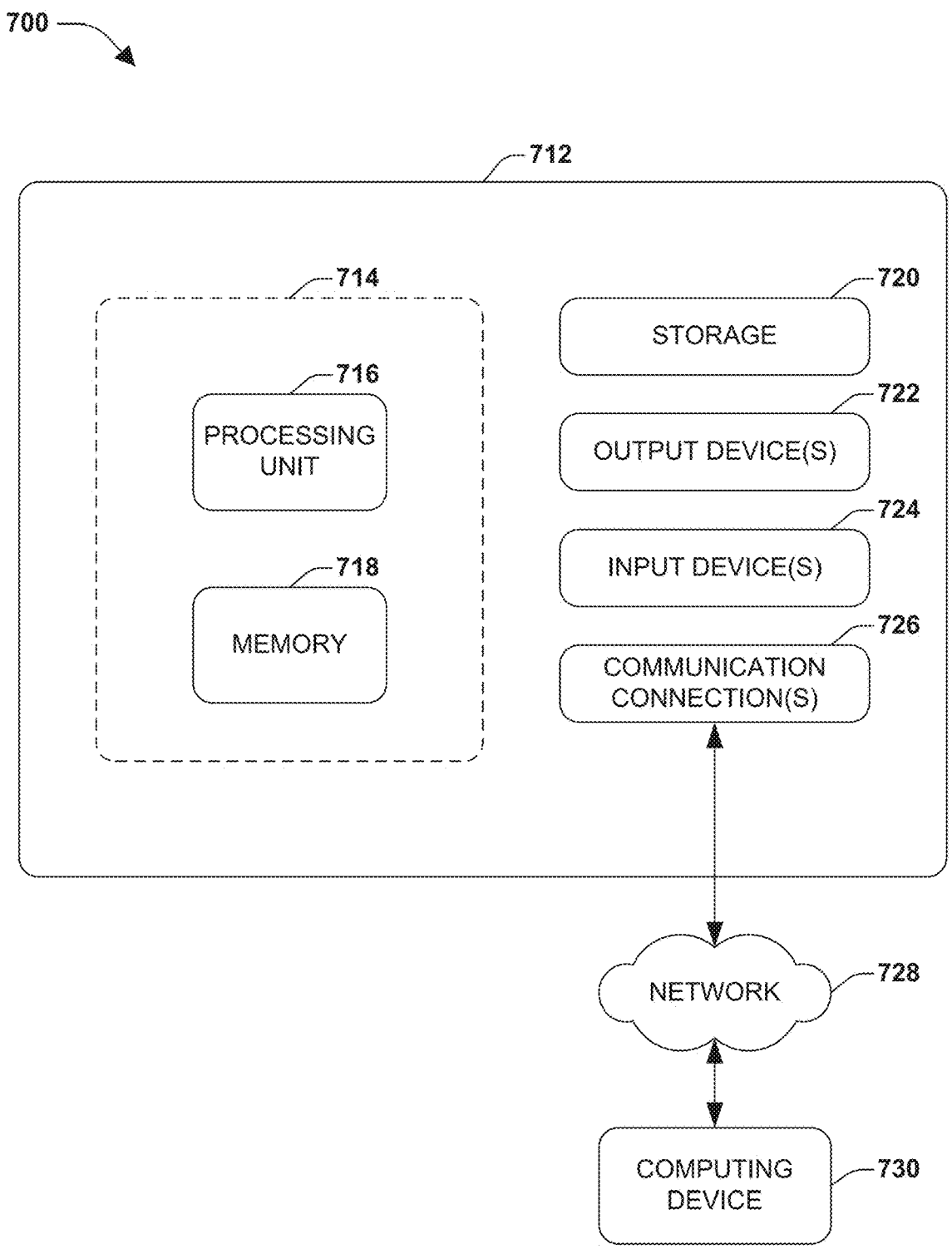
FIG. 7 illustrates an example network environment that enables aspects of the innovation.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one or more embodiments provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other embodiments, device 712 includes additional features or functionality. For example, device 712 may include additional storage such as removable storage or non-removable storage, including, but not limited to, magnetic storage, optical storage, etc. Such additional storage is illustrated in FIG. 7 by storage 720. In one or more embodiments, computer readable instructions to implement one or more embodiments provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 712. Any such computer storage media is part of device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 712 includes input device(s) 724 such as keyboard, mouse, pen, voice input device, touch input device, infrared cameras, video input devices, or any other input device. Output device(s) 722 such as one or more displays, speakers, printers, or any other output device may be included with device 712. Input device(s) 724 and output device(s) 722 may be connected to device 712 via a wired connection, wireless connection, or any combination thereof. In one or more embodiments, an input device or an output device from another computing device may be used as input device(s) 724 or output device(s) 722 for computing device 712. Device 712 may include communication connection(s) 726 to facilitate communications with one or more other devices.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has, "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A product information confirmation system, comprising:
   a processor and computer instructions stored as executable components in a non-volatile memory comprising:

a product request receiving component that receives a product information request from a user;
a product information component comprising:
   a rendering component configured to display product information to the user in response to the product information request,
   a verification component that verifies that the product information has been received and understood by the user, wherein the verification component generates at least one interactive question about the product information, and wherein a correct answer submitted by the user to the at least one interactive question verifies that the product information has been understood by the user, and
   a code generating component that generates, upon verification that the product information has been understood by the user, an access code that is unique to the user such that the access code is associated with identifying information of the user and a product corresponding to the product information request;
a code transmission component that transmits the access code to the user; and
a validation component that validates (i) the identifying information of the user and (ii) the access code as being associated with the identifying information of the user and with the product corresponding to the product information request from the user and authorizes, upon the validation, a transaction to purchase the product or a submission of an application for the product.

2. The product information confirmation system of claim 1, wherein the code transmission component transmits the access code via text message, email, telephone, or a combination of two or more thereof.

3. The product information confirmation system of claim 1, wherein the access code is associated with personal information of the user.

4. The product information confirmation system of claim 1, wherein
the validation component requires two-factor authentication to authorize the transaction to purchase the product or the submission of the application for the product.

5. The product information confirmation system of claim 1, wherein the product information component further comprises an acknowledgement component that determines whether the user has understood at least a portion of the product information prior to generating the access code.

6. The product information confirmation system of claim 5, wherein the product information is displayed as a video.

7. The product information confirmation system of claim 6, wherein the video includes the at least one interactive question.

8. A non-transitory computer-readable storage device that stores executable instructions that, in response to execution, causes a system comprising a processor to perform operations, comprising:
initiating a product information request on behalf of a user;
displaying product information in response to the product information request;
generating at least one interactive question about the product information;
verifying receipt and understanding of the product information by the user, wherein a correct answer submitted by the user to the at least one interactive question verifies that the product information has been understood by the user;
generating, upon verification that the product information has been understood by the user, an access code that is unique to the user such that the access code is associated with identifying information of the user and a product corresponding to the product information request;
transmitting the access code to the user; and
validating (i) the identifying information of the user and (ii) the access code as being associated with the identifying information of the user and with the product and authorizing, upon the validation, a transaction to purchase the product or a submission of an application for the product.

9. The non-transitory computer-readable storage device of claim 8, further comprising associating the access code with personal information of the user.

10. The non-transitory computer-readable storage device of claim 8, wherein the validation comprises two-factor authentication.

11. The non-transitory computer-readable storage device of claim 8, wherein the access code occurs is transmitted via text message, email, telephone, or a combination of two or more thereof.

12. The non-transitory computer-readable storage device of claim 8, wherein the product information is displayed as a video, wherein the video includes the at least one interactive question.

13. A system of verifying a transaction, comprising:
a processor and computer instructions stored as executable components in a non-volatile memory comprising:
a component that identifies and requests product information on behalf of a user;
a component that displays the product information and verifies that the product information has been received by the user;
a component that generates at least one interactive question about the product information, wherein a correct answer submitted by the user to the at least one interactive question verifies that the product information has been understood by the user;
a component that generates, upon verification that the product information has been understood by the user, an access code that is unique to the user such that the access code is associated with identifying information of the user and a product corresponding to the product information;
a component that transmits the access code to the user; and
a component that validates (i) the identifying information of the user and (ii) the access code as being associated with the identifying information of the user and with the product corresponding to the requested production information and authorizes, upon the validation, a transaction to purchase the product or a submission of an application for the product.

14. The system of claim 13, wherein the component that generates the access code associates the access code with personal information of the user.

15. The system of claim 14, wherein the component that validates the access code requires two-factor authentication to authorize the transaction to purchase the product or the submission of the application for the product.

16. The system of claim 13, wherein the access code is transmitted via text message, email, telephone, or a combination of two or more thereof.

* * * * *